United States Patent
Kämäräinen

(10) Patent No.: US 11,131,746 B2
(45) Date of Patent: Sep. 28, 2021

(54) WIRELESS POSITIONING

(71) Applicant: Teknologian tutkimuskeskus VTT Oy, Espoo (FI)

(72) Inventor: Jukka Kämäräinen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 277 days.

(21) Appl. No.: 16/381,034

(22) Filed: Apr. 11, 2019

(65) Prior Publication Data

US 2019/0317183 A1    Oct. 17, 2019

(30) Foreign Application Priority Data

Apr. 11, 2018    (FI) ..................................... 20185350

(51) Int. Cl.
   *G01S 5/14*      (2006.01)
   *G01S 5/02*      (2010.01)

(52) U.S. Cl.
   CPC .............. *G01S 5/14* (2013.01); *G01S 5/0226* (2013.01)

(58) Field of Classification Search
   CPC . G01S 5/14; G01S 5/02; G01S 5/0252; G01S 5/0226; G01S 5/12; G01S 13/003; G01S 13/878
   USPC ......................................................... 342/453
   See application file for complete search history.

(56) References Cited

U.S. PATENT DOCUMENTS

| | | | |
|---|---|---|---|
| 2008/0103696 A1 | 5/2008 | Cheok et al. | |
| 2008/0234930 A1* | 9/2008 | Cheok ................. | G01S 5/0284 701/408 |
| 2010/0331013 A1* | 12/2010 | Zhang .................. | G01S 5/0242 455/456.2 |
| 2013/0005347 A1 | 1/2013 | Curticapean | |
| 2013/0029685 A1* | 1/2013 | Moshfeghi ........... | G06Q 20/409 455/456.1 |
| 2015/0063138 A1 | 3/2015 | Aldana | |
| 2017/0034674 A1* | 2/2017 | Radhakrishnan ....... | H04W 4/14 |
| 2019/0069264 A1* | 2/2019 | Seth ....................... | G01S 5/0289 |

FOREIGN PATENT DOCUMENTS

| | | | |
|---|---|---|---|
| CN | 108024329 A | * | 5/2018 |
| WO | WO2012170046 A1 | | 12/2012 |
| WO | WO2013002812 A2 | | 1/2013 |

(Continued)

OTHER PUBLICATIONS

Saad et al: High accuracy location estimation for a mobile tag using one-way UWB signaling. Proceedings of confrence on ubiquitous positioning indoor navigation and location based services (UPINLBS), Oct. 3-4, 2012.

*Primary Examiner* — Harry K Liu
(74) *Attorney, Agent, or Firm* — Laine IP Oy

(57) ABSTRACT

According to an example aspect of the present invention, there is provided an apparatus comprising a receiver configured to receive at least the following wireless messages: an initial message from a master base station, at least one response message from each of at least two non-master base stations and a data message from the master base station, and at least one processing core configured to determine, based on the received wireless messages, for the master base station and each non-master base station, a time difference of arrival from the apparatus, and based at least partly on the determined time difference of arrival, a location of the apparatus.

16 Claims, 8 Drawing Sheets

(56) References Cited

FOREIGN PATENT DOCUMENTS

| WO | WO2015031029 A1 | 3/2015 |
|----|-----------------|--------|
| WO | WO2015031031 A1 | 3/2015 |
| WO | WO2016193897 A1 | 12/2016 |
| WO | WO2016207297 A1 | 12/2016 |

* cited by examiner

WIRELESS POSITIONING

FIELD

The present invention relates to positioning of devices using electromagnetic waves, sound or optical signals. Positioning may comprise determining a location of a device, for example.

BACKGROUND

Determining a location of a device using wireless signals may be accomplished by using signals from wireless stations of known locations. Wireless signals may, in general, comprise radio signals, or signals in other parts of the electromagnetic spectrum than the radio part or sound signals.

Trilateration comprises determining locations of points by measuring distances. To determine a location on a two-dimensional surface, such as terrain, determining that a location lies on two intersecting circles provides two possible locations. A third circle, or another kind of additional piece of information, may be used to select one of the two possible locations. This method is also referred to as TOA positioning, time of arrival location method.

Triangulation on the other hand comprises determining a location using triangles that are determined for positioning. This method is also referred to as AOA positioning, angle of arrival location method. Unlike trilateration, in triangulation angles are determined, rather than distances. A combination of trilateration and triangulation, that is, determination of both angles and distances, may be referred to as triangulateration.

Multilateration, on the other hand, is based on determining differences in distance to known locations, rather than distances as such. When two known stations are used, the location is determined as lying on a hyperbolic curve or surface and additional information may be employed to select point on the hyperbolic curve or surface as the estimated location of the device. This method is also referred to as TDOA positioning, time difference of arrival location method.

Wireless stations may be configured to determine their location using one or more methods. Positioning methods further may include satellite positioning, for example based on the global positioning system, GPS, or Galileo satellite constellations, and positioning based on wireless local area networking access point names. A location of wireless stations may be determined during installation, and/or wireless stations may have an ability to determine their location with respect to base stations automatically.

SUMMARY OF THE INVENTION

According to some aspects, there is provided the subject-matter of the independent claims. Some embodiments are defined in the dependent claims.

According to a first aspect of the present invention, there is provided an apparatus comprising a receiver configured to receive at least the following wireless messages: an initial message from a master base station, at least one response message from each of at least two non-master base stations and a data message from the master base station, and at least one processing core configured to determine, based on the received wireless messages, for the master base station and each non-master base station, a time difference of arrival from the apparatus, and based at least partly on the determined time difference of arrival, a location of the apparatus.

Various embodiments of the first aspect may comprise at least one feature from the following bulleted list:
- the apparatus is configured to determine the location further based on a ratio, determined separately for each specific non-master base station, between a first time delay and a second time delay, the first time delay elapsing between transmission of the initial message from the master base station and its receipt in the specific non-master base station and the second time delay elapsing between the transmission of the initial message from the master base station and transmission of the data message from the master base station
- the data message comprises timestamps indicating for each response message a point in time, when the master base station received this response message
- the data message comprises a timestamp indicating a point in time, when the master base station transmitted the data message
- the initial message comprises a timestamp indicating a point in time, when the master base station transmitted the initial message
- the apparatus is configured to record for each response message a timestamp indicating when the apparatus received this response message
- the apparatus is configured to record for the initial message a timestamp indicating when the apparatus received the initial message
- the apparatus is configured to record for the data message a timestamp indicating when the apparatus received the data message
- the apparatus is configured to receive the wireless messages using an ultra wide band, UWB, wireless interface
- the apparatus is configured to determine the location of the apparatus without transmitting any wireless messages According to a second aspect of the present invention, there is provided an apparatus comprising a wireless transceiver configured to transmit an initial message, to receive at least one response message from at least one non-master base station and to transmit a data message, and at least one processing core configured to include in the initial message a timestamp indicating a point in time when the initial message is transmitted, and to include in the data message, for each received response message, a timestamp indicating a point in time when the respective response message was received in the apparatus.

Various embodiments of the second aspect may comprise at least one feature from the following bulleted list:
- the apparatus is configured to include in the data message a timestamp indicating a point in time, when the data message is transmitted
- the wireless transceiver is an ultra wide band wireless transceiver.

According to a third aspect of the present invention, there is provided a method comprising receiving, in an apparatus, at least the following wireless messages: an initial message from a master base station, at least one response message from each of at least two non-master base stations and a data message from the master base station, and determining, based on the received wireless messages, for the master base station and each non-master base station, a time difference of arrival from the apparatus, and determining, based at least partly on the determined time difference of arrival, a location of the apparatus.

Various embodiments of the third aspect may comprise at least one feature corresponding to a feature on the preceding bulleted list laid out in connection with the first aspect.

According to a fourth aspect of the present invention, there is provided a method in an apparatus comprising transmitting an initial message, receiving at least one response message from at least one non-master base station and transmitting a data message, and including in the initial message a timestamp indicating a point in time when the initial message is transmitted, and including in the data message, for each received response message, a timestamp indicating a point in time when the respective response message was received in the apparatus.

Various embodiments of the fourth aspect may comprise at least one feature corresponding to a feature on the preceding bulleted list laid out in connection with the second aspect.

According to a fifth aspect of the present invention, there is provided an apparatus comprising means for receiving, in an apparatus, at least the following wireless messages: an initial message from a master base station, at least one response message from each of at least two non-master base stations and a data message from the master base station, and means for determining, based on the received wireless messages, for the master base station and each non-master base station, a time difference of arrival from the apparatus, and for determining, based at least partly on the determined time difference of arrival, a location of the apparatus.

According to a sixth aspect of the present invention, there is provided an apparatus comprising means for transmitting an initial message, receiving at least one response message from at least one non-master base station and transmitting a data message, and means for including in the initial message a timestamp indicating a point in time when the initial message is transmitted, and for including in the data message, for each received response message, a timestamp indicating a point in time when the respective response message was received in the apparatus.

According to a seventh aspect of the present invention, there is provided a non-transitory computer readable medium having stored thereon a set of computer readable instructions that, when executed by at least one processor, cause an apparatus to at least receive at least the following wireless messages: an initial message from a master base station, at least one response message from each of at least two non-master base stations and a data message from the master base station, and determine, based on the received wireless messages, for the master base station and each non-master base station, a time difference of arrival from the apparatus, and determine, based at least partly on the determined time difference of arrival, a location of the apparatus.

According to an eighth aspect of the present invention, there is provided a non-transitory computer readable medium having stored thereon a set of computer readable instructions that, when executed by at least one processor, cause an apparatus to at least transmit an initial message, receive at least one response message from at least one non-master base station and transmit a data message, and include in the initial message a timestamp indicating a point in time when the initial message is transmitted, and include in the data message, for each received response message, a timestamp indicating a point in time when the respective response message was received in the apparatus.

According to a ninth aspect of the present invention, there is provided a computer program configured to cause a method in accordance with at least one of the third and fourth aspects to be performed

EMBODIMENTS

The herein disclosed positioning methods enable single and/or plural mobile or stationary tags to determine their location by receiving messages only, meaning the tag or tags do not need to transmit messages to determine their location. Wireless messages are transmitted by a master base station and one or more non-master base stations, with the tag or tags listening to the wireless messages transmitted by the base stations.

Figure 1:
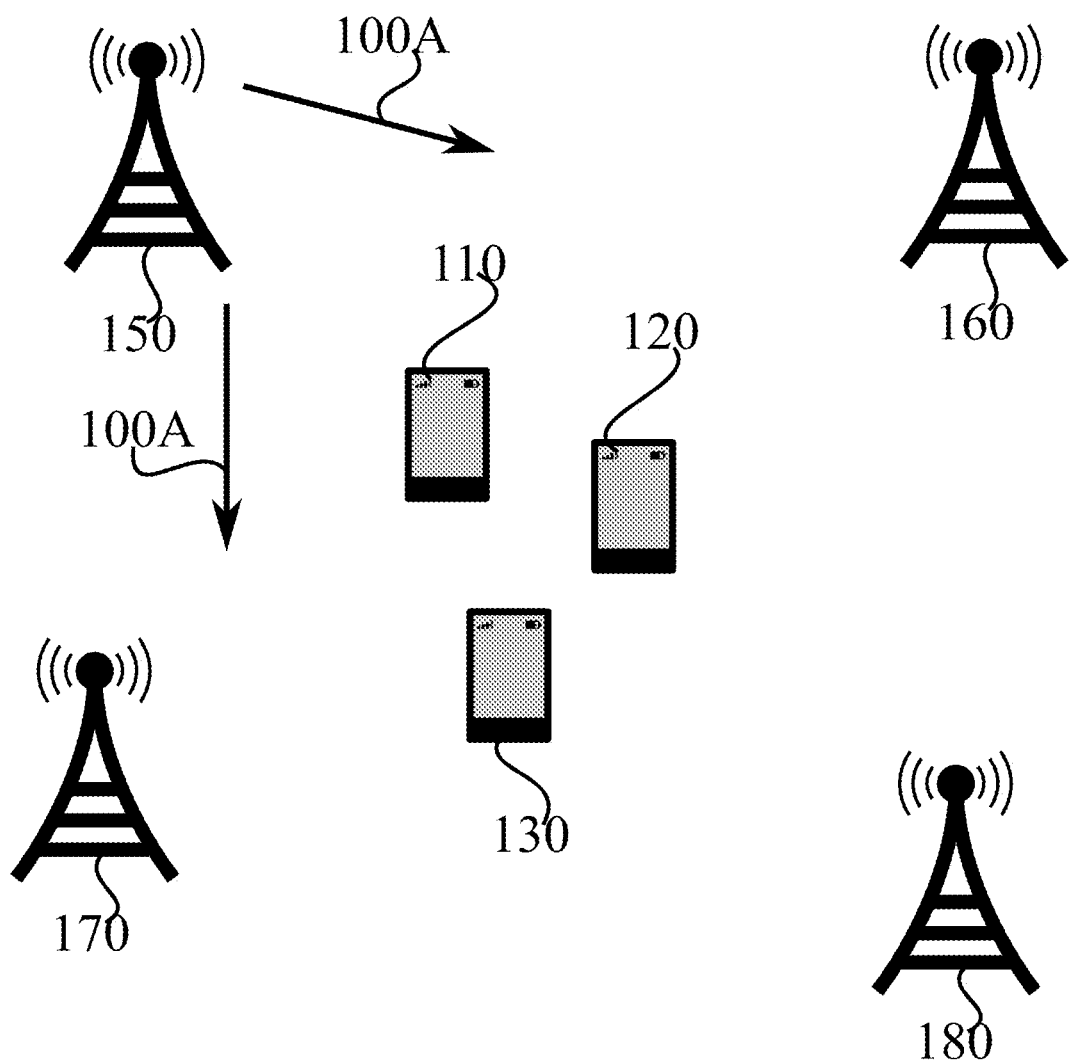
FIG. 1 illustrates an example system in accordance with at least some embodiments of the present invention.

FIG. 1 illustrates an example system in accordance with at least some embodiments of the present invention. The example system comprises master base station 150 and non-master base stations 160, 170 and 180. The locations of the base stations are known. For example, the base stations may have determined their locations using satellite positioning, or human operators may have configured the base stations with information concerning their locations. One master and three non-master base stations is one numerical example to which the present invention is not limited, rather, the principles of the present invention are usable with one master and two, four or indeed another number of non-master base stations, for example. In some cases, a larger number of non-master base stations results in a more accurate location estimate. In general, the set of base stations may comprise one master base station and at least two non-master base stations.

The system illustrated in FIG. 1 further comprises tags 110, 120 and 130. As was the case with the non-master base stations, the invention is not limited to the number of tags in FIG. 1. Indeed, one of the benefits of the present invention is that it may support a relatively large number of tags far exceeding three. Each tag may comprise a device enabled to receive wireless messages transmitted by the base stations, such as master base station 150 and non-master base stations 160, 170 and 180, and to perform mathematical operations. To enable this, each tag may comprise a wireless receiver, at least one processing core and memory. The tags may comprise, for example, positioning components of mobile phones, RFID positioning tags or tracking tags. Not all of the tags need be of a same type.

The base stations may be configured to operate in accordance with a suitable radio technology, such as, for example, ultra wide band, UWB. UWB is a technology for transmitting a large bandwidth, for example wider than 500 megahertz or wider than 700 megahertz. UWB communications may be based on an impulse radio, which may employ a combination of burst position modulation, BPM, and binary phase shift keying, BPSK. IEEE standard 802.15.4-2011 contains an example of such a UWB communication technology. Other impulse radio technologies may alternatively or in addition be used, which enable a sufficiently accurate signal transmit and reception time determination for example, to effectively make use of the wide frequency range. Other example technologies include cellular and non-cellular technologies. Examples of cellular technologies include long term evolution, LTE, and wideband code division multiple access, WCDMA. Examples of non-cellular technologies include wireless local area network, WLAN, and worldwide interoperability for microwave access, WiMAX. A non-cellular base station may be referred to as an access point, however, in the present document the expression "base station" is used for both cellular and non-cellular technologies, for the sake of simplicity. In some embodiments, the base stations may be configured to operate wireless communication technology that based on an optical signal or sound signal. These technologies enable signal transmission and reception time determination also.

In general, a base station may be configured to operate a wireless link with a terminal device, such as, for example, a tag. A wireless link may comprise a downlink arranged to convey information from the base station to the terminal, and/or an uplink arranged to convey information from the terminal to the base station. Uplink and/or downlink communication may use, for example, UWB or another wireless technology, such as BLE, Bluetooth, WLAN, LoRa, 2G, 3G, 4G or 5G mobile network. In addition to the above, Li-Fi technology may used to uplink and/or downlink communication. Li-Fi is a technology for wireless communication that uses visible light spectrum, ultraviolet or infrared radiation.

In accordance with at least some embodiments of the present invention, base stations such as master base station 150 and non-master base stations 160, 170 and 180 are capable of receiving wireless messages from each other.

In FIG. 1, master base station 150 transmits an initial message 100A. Initial message 100A may be transmitted from master base station 150 in a non-directed manner, that is, omnidirectionally in the sense that the message is not transmitted only to a specific direction. This enables reception of the initial message 100A by plural nodes. The initial message may comprise a timestamp 100A_TX, indicating a point in time, when the master base station transmits the initial message. The master base station may, for example, obtain a current time from an internal clock of the master base station, compile the initial message using the current time and send the initial message without waiting. In some embodiments, the master base station may augment the current time obtained from the internal clock with a delay value which corresponds to the time it takes the master base station to transmit the message, such that the timestamp more accurately reflects the moment in time the initial message issues from antennas of the master base station. Delay values for different base stations may be configured during system setup or calibration, or at manufacture of the base stations, for example. The delay values are useful, for example, where the master base station and the non-master base stations have different electronics. Initial message 100A may further comprise the location of master base station 150, expressed for example in geo-coordinates. The invention may be used indoors, where two- or three-dimensional location coordinates for the locations of the base stations may be used. A three-dimensional location of master base station 150 may have been determined in connection with installation, for example.

Initial message 100A may be received by each non-master base station 160, 170 and 180. Likewise, initial message 100A may be received by tags 110, 120 and 130. Each tag may record a timestamp indicating a time of receipt of the initial message 100A, as well as the timestamp 100A_TX from initial message 100A which informs the time of transmission of initial message 100A. The timestamp of receipt of initial message 100A for a tag may be expressed as 100A_TAG_RX. In determining this timestamp, tags may be configured to decrement from their internal clocks a delay value corresponding to a time it takes for the tag to process the initial message, such that the timestamp reflects a time, when the initial message was present at an antenna of the tag. In case the tags have modest processing capability, they may take some time to process an incoming message wherefore using a delay value may increase accuracy. Delay values may be determined in a calibration process, or during manufacture of the base stations and/or tags, for example.

Figure 2:
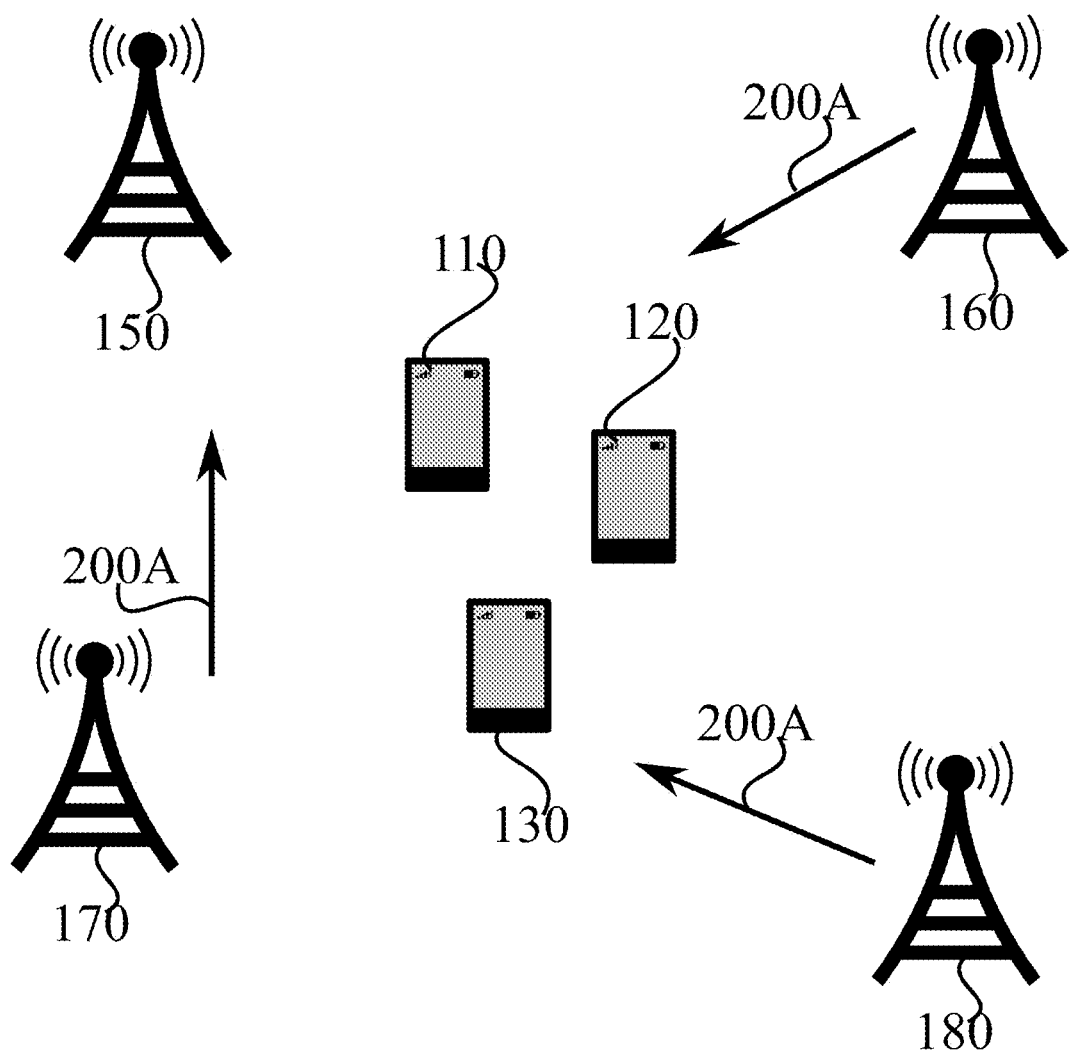
FIG. 2 illustrates an example system in accordance with at least some embodiments of the present invention.

FIG. 2 illustrates an example system in accordance with at least some embodiments of the present invention. The base stations and tags correspond to those of FIG. 1. The situation illustrated in FIG. 2 takes place after the transmission of the initial message 100A, which was illustrated in FIG. 1. FIG. 2 illustrates the transmission of response messages 200A from the non-master base stations 160, 170 and 180. The non-master base stations may be configured to transmit a response message 200A responsive to receipt, from master base station 150, of an initial message 100A.

The non-master base stations may transmit their respective response message in turn, or simply responsive to the initial message. Response message 200A may further comprise the location of the non-master base station which transmits the response message, expressed, for example, in geo-coordinates. Using two- or three-dimensional coordinate systems, locations of base stations may be determined in two or three dimensions, respectively, for example in connection with their installations in their locations. Non-master base stations may each have a timeslot in a frame structure, which this non-master base station is configured to use in transmitting response messages 200A. The timeslot may be configured in the non-master base station by the initial message 100A, or the non-master base stations may be otherwise configured with the timeslot.

Response messages 200A may, like the initial message 100A, be transmitted in a non-directed manner to enable their receipt by plural receivers. Response messages 200A are received by master base station 150 and the tags 110, 120 and 130. Master base station 150 may be configured to record a timestamp indicating the moment of time when master base station 150 receives each one of the response messages. The timestamp of receipt of response message 200A from the n:th non-master base station may be expressed as 200A_MBS_n_RX. The timestamp may be generated with a delay value reflecting a processing delay of master base station 150, so the timestamp more accurately registers a time when the response message 200A was in an antenna of master base station 150. Likewise, each tag may be configured to record a timestamp indicating a time of receipt at the tag of each response message 200A. The timestamp of receipt of response message 200A for the n:th non-master base station may be expressed as 200A_TAG-_n_RX. The tags may employ a delay value in generating the timestamp 200A_TAG_n_RX.

Figure 3A:
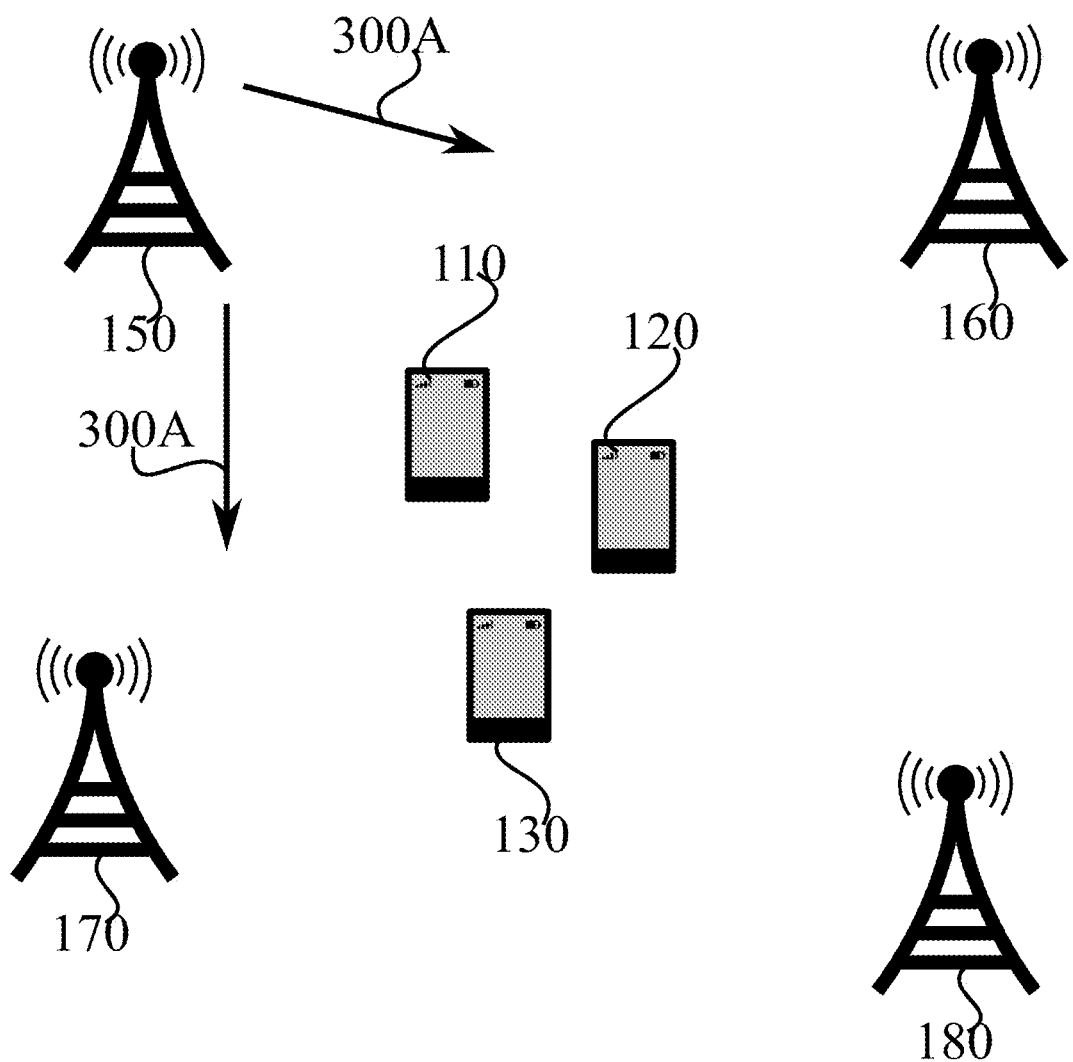
FIG. 3A illustrates an example system in accordance with at least some embodiments of the present invention.

FIG. 3A illustrates an example system in accordance with at least some embodiments of the present invention. The base stations and tags correspond to those of FIG. 1 and FIG. 2. The moment illustrated in FIG. 3A takes place after the transmission of the response messages 200A, which were illustrated in FIG. 2.

In FIG. 3A, master base station 150 transmits a data message 300A. Data message 300A may be transmitted in a non-directed manner to enable its receipt by plural receivers. Data message 300A may comprise a timestamp indicating the time of its transmission, as was the case with initial message 100A. The timestamp indicating the time of transmission of data message 300A may be denoted as 300A_TX. Data message 300A may comprise the timestamps 200A_MBS_n_RX recorded by master base station 150, indicating the times of receipt at the master base station of the response messages 200A.

Data message 300A may further comprise the timestamp indicating the time of transmission from master base station 150 of initial message 100A, 100A_TX. The timestamp relating to initial message 100A may assist tags in associating data message 300A with the correct initial message 100A. Data message 300A may further comprise the location of master base station 150, for example in case initial message 100A did not comprise it.

Tags 110, 120 and 130 may record the contents of data message 300A, as well as a timestamp indicating the time of receipt in the tag of data message 300A. These timestamps may be denoted as 300A_TAG_RX. Messages 100A, 200A and 300A may comprise a sequence number identifying a sequence, the sequence comprising messages 100A, 200A and 300A. The sequence begins with transmission of the 100A message from the master base station and the sequence concludes with transmission, from the master base station, of the 300A message. Messages 100A, 200A and 300A may comprise a sender address or identifier. When the master base station conveys 200A_MBS_n_RX timestamps, it may convey a base station address or identifier, thereby assisting tags to understand, which non-master base station transmitted the message 200A the timestamp relates to.

Each tag may then determine an estimate of its own location, using the information it has as a result of the messaging described herein above, according to the following process:

Firstly, each tag may determine a synchronization value for each base station. A synchronization value SYNC_n for base station n may be determined in a tag as:

SYNC_$n$=(300A_TX−100A_TX)/(200A_MBS_$n$_RX−BS_MBS_$n$_range_$t$−100A_TX), where BS_MBS_n_range_t is a time of flight of a wireless message from non-master base station n to the master base station (the locations of the base stations are known beforehand). In some embodiments, the SYNC values for each non-master base station are computed in the master base station, and the SYNC values are included in data message 300A. This provides the advantage that the tags, which may have more limited processing capability, do not need to determine SYNC values. The formula provided above is one example of how to determine the SYNC value.

The master base station and the tags each have time counters. The time counters may have a maximum value 0xffffffff in hexadecimal. The time counters may keep track of time, for example using a 64 GHz clock. Once a time counter reaches its maximum value, it may loop back to zero. The time counters may be employed in generating timestamps as described herein. The master base station and each tag may start in an unsynchronized manner, and these clocks may have frequency offsets, dynamic noise and static noise.

Figure 3B:
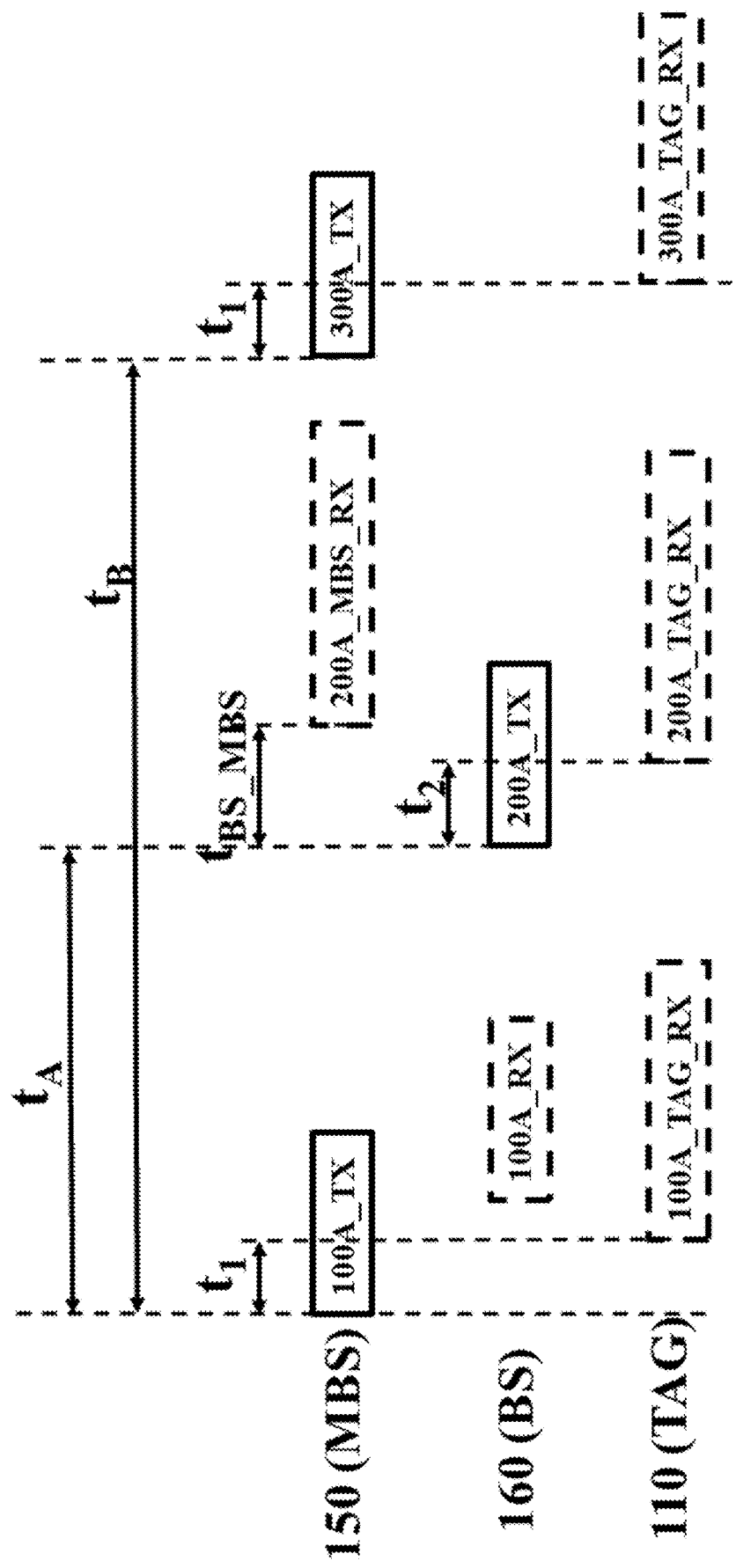
FIG. 3B illustrates time difference of arrival, TDOA, messaging in accordance with at least some embodiments of the present invention.

FIG. 3B illustrates time difference of arrival, TDOA, messaging in accordance with at least some embodiments of the present invention. Master base station 150, labeled as MBS), non-master base station 160, labeled as BS, and tag 110 are disposed on the left. Time advances from the left toward the right. Time $t_A$ corresponds to the time between transmission of the initial message 100A from master base station 150 to transmission of the response message 200A from non-master base station 150. Time $t_B$ corresponds to the time between transmission of the initial message 100A from master base station 150 to transmission of the data message 300A from the master base station 150.

Time $t_1$ corresponds to the time between transmission of initial message 100A from master base station 150 to its reception in tag 110. The same time elapses from the transmission of data message 300A from the master base station to its receipt in tag 110. Time $t_2$ corresponds to the time between transmission of response message 200A from non-master base station 160 to its reception in tag 110. Time $t_{BS-MBS}$ corresponds to the time between transmission of response message 200A from non-master base station 160 to its reception in master base station 150. The TDOA time is the difference in radio signal flight time between, a message 200A from a non-master base station 160 to the tag 110 (time $t_2$) and a message 100A or 300A from the master base station 150 to the tag 110 (time $t_1$). In terms of FIG. 3B 3B, TDOA=$t_2$−$t_1$ or TDOA=$t_1$−$t_2$.

In determining the SYNC values, a time counter in the master base station may be used to determine when the non-master base stations have transmitted their response messages 200A. The non-master base stations may be configured to transmit their response messages 200A asynchronously, as long as they avoid collision. A timeslot allocation can be used to avoid collisions. From the FIG. 3B, SYNC corresponds to a ratio $t_B/t_A$.

Although a clock frequency of the tag 110 time counter can significantly deviate from the clock frequency of the master base station 150 time counter, the relative transmission time of the response message 200A message sent by the non-master base station 160 can be calculated in the tag 110 using the SYNC value. This makes possible that the time $t_B$ is time between transmissions of the initial messages 100A_TX and data message 300A_TX and the same time passed between receiving messages 100A_TAG_RX and 300A_TAG_RX in the tag. Times are same for the assumption that the tag moves short distance (maximum several tens of cents) between transmissions of the messages. It should be noted that exact transmission time of the response 200A message may not be known because the $t_1$ time is unknown and the distance from the master base station to the tag 110 is unknown also.

As illustrated in FIG. 3B, using timestamps of receiving messages 100A_TAG_RX and 200A_TAG_RX can be counted in the TAG, $t_A$=200A_TAG_RX−$t_2$−(100A_TAG_RX−$t_1$). For this equation can be solved, TDOA=200A_TAG_RX−100A_TAG_RX−$t_A$, because TDOA=$t_2$−$t_1$. On the other hand, SYNC=$t_B/t_A$, which can be converted to $t_A$=$t_B$/SYNC, whereby the TDOA is resolved as follows, TDOA=200A_TAG_RX−100A_TAG_RX−$t_B$/SYNC. As noted above, the propagation time of messages 100A and 300A from the master base station to the TAG are the same, $t_1$, so $t_B$ can be calculated using timestamps of the receiving messages; $t_B$=300A_TAG_RX−100A_TAG_RX. Now TDOA can be solved in the TAG,

TDOA=200A_TAG_RX−100A_TAG_RX−
(300A_TAG_RX−100A_TAG_RX)/SYNC.

The time-difference-of-arrival, TDOA, from the master base station and each non-master base station n to the tag may then be determined in each tag as: TDOA_n=200A_TAG_n_RX−100A_TAG_RX−(300A_TAG_RX−100A_TAG_RX)/SYNC_n. This formula is one example of how TDOA times may be obtained. In addition to the above example, the SYNC and TDOA values can also be calculated in another way. The relation value SYNC can also be calculated, SYNC=$t_A/t_B$, whereby the SYNC is calculated as follows: SYNC_n=(200A_MBS_n_RX−BS_MBS_n_range_t−100A_TX)/(300A_TX−100A_TX). In this case, the TDOA formula has the form: TDOA=200A_TAG_n_RX−100A_TAG_RX−(300A_TAG_RX−100A_TAG_RX)*SYNC_n.

Once the TDOA values for the base stations have been determined, the tag location may be determined based on this and the known location information of the master and non-master base stations. The location may be estimated using known positioning algorithms, such as iterative least squares Gauss-Newton, iterative weighted least squares Gauss-Newton and the Bayesian methods. In general, the initial message 100A, the response message 200A and the data message 300A are distinct types of message. In general, the tag determines the TDOA values using the SYNC values.

Figure 4:
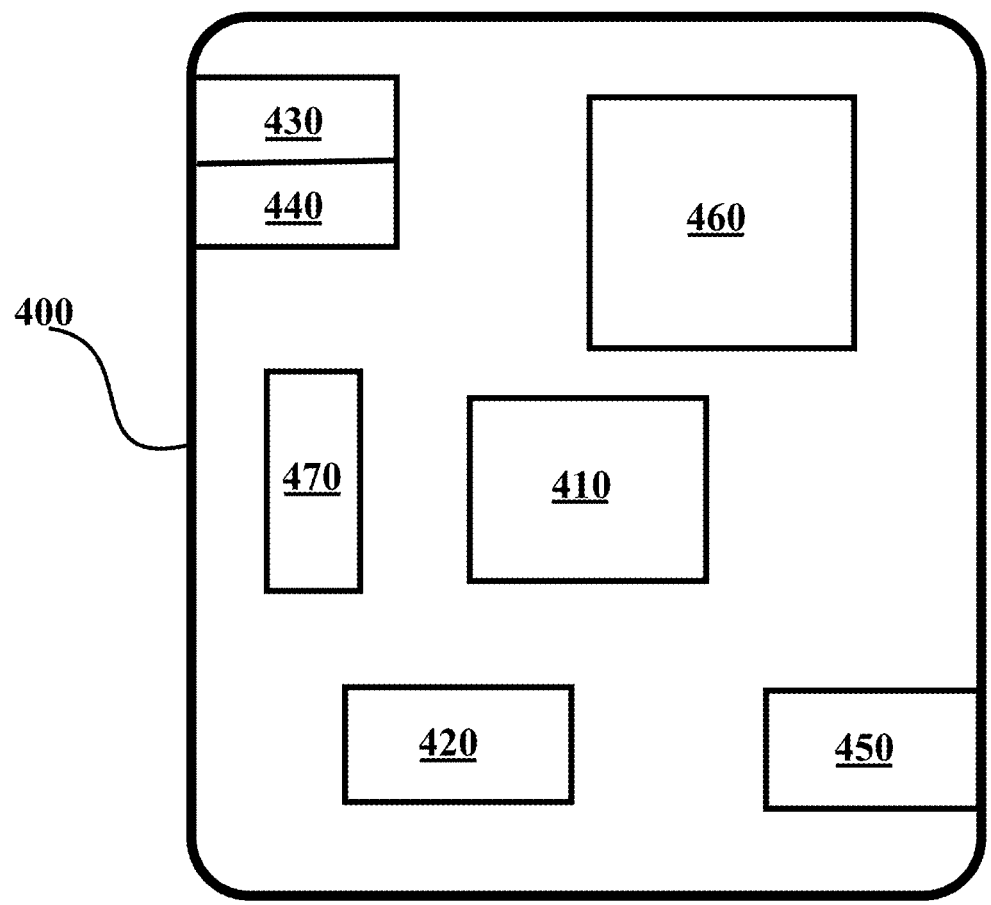
FIG. 4 illustrates an example apparatus capable of supporting at least some embodiments of the present invention.

FIG. 4 illustrates an example apparatus capable of supporting at least some embodiments of the present invention. Illustrated is device 400, which may comprise, for example, in applicable parts, a communication device such as a base station or tag of FIG. 1, FIG. 2 or FIG. 3. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-M4 processing core manufactured by ARM Holdings or a Steamroller processing core produced by Advanced Micro Devices Corporation. Processor 410 may comprise at least one Qualcomm Snapdragon and/or Intel Atom processor. Processor 410 may comprise at least one application-specific integrated circuit, ASIC. Processor 410 may comprise at least one field-programmable gate array, FPGA. Processor 410 may be means for performing method steps in device 400. Processor 410 may be configured, at least in part by computer instructions, to perform actions.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example. The transmitter 430 and receiver 440 may be configured to communicate in accordance with IEEE 802.15.4-2011 UWB impulse radio. An example of this is a Decawave DW1000 IC, or another standard or non-standard impulse radio. Transmitter 430 and receiver 440 may comprise, or be coupled with, at least one antenna for receiving and/or transmitting wireless messages. Transmitter 430 and/or receiver 440 may uses wireless communication technology that based on an optical signal or sound signal.

Device 400 may comprise a near-field communication, NFC, transceiver 450. NFC transceiver 450 may support at least one NFC technology, such as NFC, Bluetooth, BLE, Wibree or similar technologies.

Device 400 may comprise user interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to request positioning information.

Device 400 may comprise or be arranged to accept a user identity module 470. User identity module 470 may comprise, for example, a subscriber identity module, SIM, card installable in device 400. A user identity module 470 may comprise information identifying a subscription of a user of device 400. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some embodiments, device 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the present invention. In general, the master base station and/or the non-master base station functionalities may be comprised in a same apparatus as a fifth generation, 5G, base station. The tags may be comprised in or as 5G mobile devices, such as user equipments. A tag may be configured to transmit its location to the master base station, or to another device, operably connected to a server. A cloud server is an example of a server. The tags may employ UWB or another wireless technology, such as BLE, Bluetooth or WLAN, to accomplish this. Further examples include LoRa, 2G, 3G, 4G or 5G mobile network or Li-Fi technology or others else wireless optical communication methods.

Figure 5:
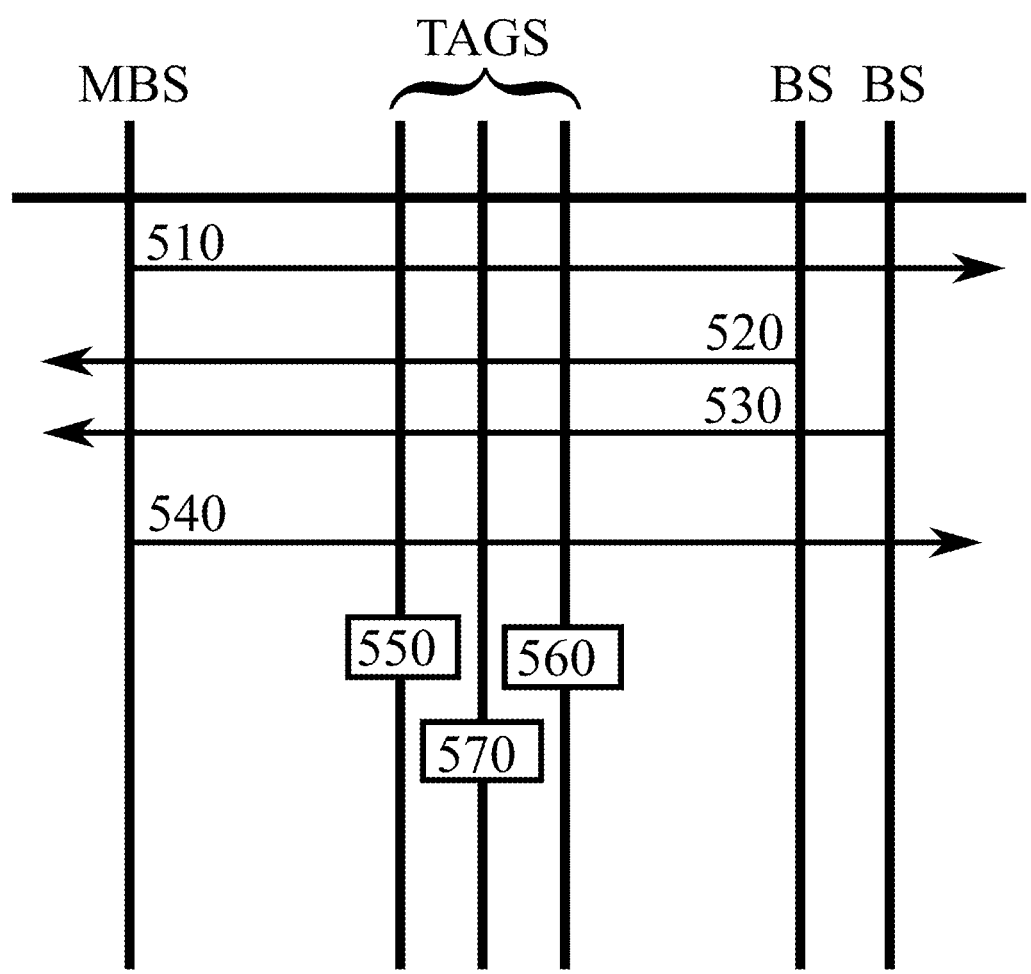
FIG. 5 illustrates signalling in accordance with at least some embodiments of the present invention.

FIG. 5 illustrates signalling in accordance with at least some embodiments of the present invention. On the vertical axes are disposed, on the left, a master base station MBS, in the centre three tags and on the right, two non-master base stations, BS. Time advances from the top toward the bottom.

In phase 510, the master base station transmits the initial message 100A, which has been described herein above. The message may be sent in an undirected manner and it may be broadcasted, by which it is meant that the message is not meant for any specific node in particular. As such, as described above, the tags and non-master base stations may all receive the initial message and react to it.

In phases 520 and 530, the non-master base stations transmit their respective response messages 200A, as described above. These messages may also be broadcasted. The non-master base stations may have a pre-determined or dynamically determined order in which they transmit these messages, to avoid a case where the messages are transmitted at the same time, causing problems in reception due to interference. The tags may receive and timestamp the response messages, as described herein above. Likewise the master base station may receive and timestamp the response messages, also as described herein above.

In phase 540, the master base station transmits the data message 300A, which is received by the tags. After the data message, the tags are in possession of the information needed to determine the SYNC and TDOA information described above, which may be used in determining, with the base station location information, in each tag, a location estimate for the tag. This occurs in phases 550, 560 and 570 in each of the tags, respectively.

Figure 6:
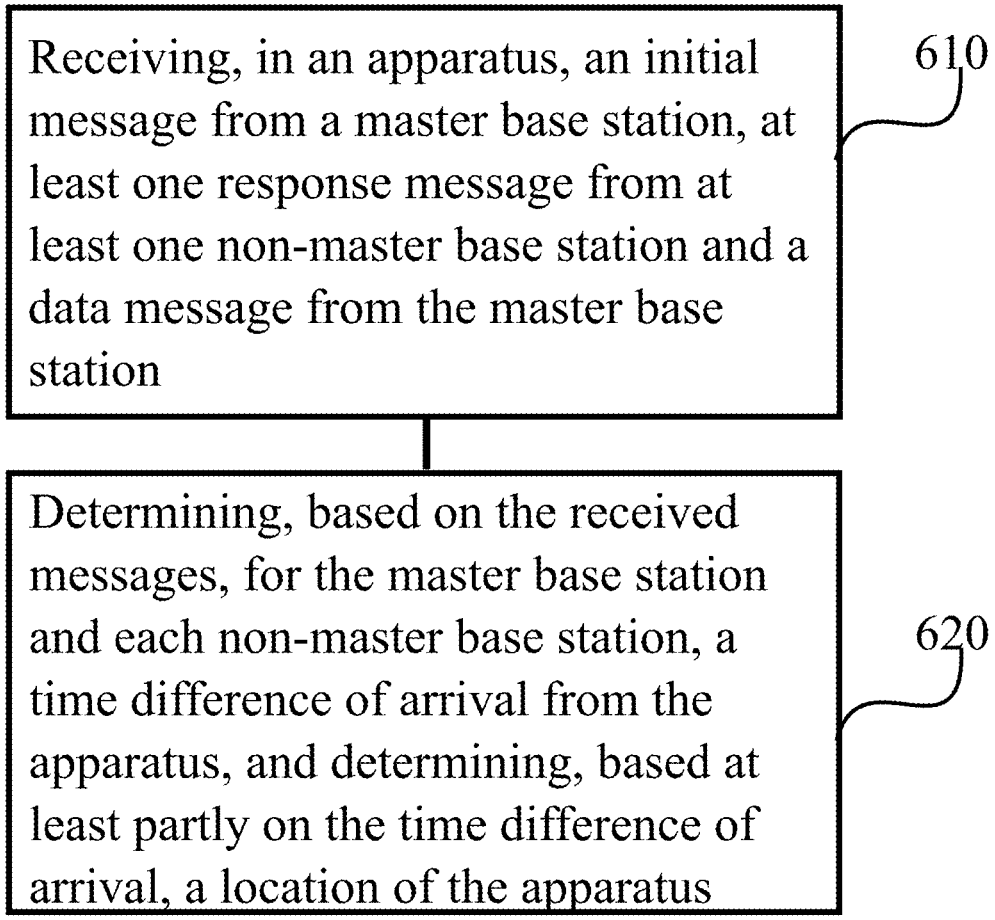
FIG. 6 is a flow graph of a method in accordance with at least some embodiments of the present invention.

FIG. 6 is a flow graph of a method in accordance with at least some embodiments of the present invention. The phases of the illustrated method may be performed in a tag 110 of FIG. 1, 2 or 3, or in a control device configured to control the functioning thereof, when installed therein.

Phase 610 comprises receiving, in an apparatus, at least the following wireless messages: an initial message from a master base station, at least one response message from at least one non-master base station and a data message from the master base station. Phase 620 comprises determining, based on the received messages, for the master base station and each non-master base station, a time difference of arrival from the apparatus, and determining, based at least partly on the determined time difference of arrival, a location of the apparatus. Positioning may be based on the known locations of the master and non-master base stations. These known locations may be determined in a two- or three-dimensional coordinate system. The time difference of arrival may reflect differences in wireless propagation times for hypothetical wireless messages transmitted from the apparatus, such as a tag. The time difference of arrival from the apparatus may comprise a difference in travel time, at light speed, between on the one hand messages from the master base station to the apparatus, and on the other hand messages from the non-master base station(s) to the apparatus.

In general, a benefit is obtained from the disclosed embodiments in that plural tags are enabled to derive their positions merely by listening on wireless messages exchanged by the master base station and the non-master base stations. As the tags needn't transmit messages of their own, their energy usage is smaller, and interference is avoided which otherwise would have resulted from the transmission of messages from the tags. Furthermore, as the tags do not transmit, the number of tags is not limited in the system, rather, a large number of tags may each independently participate in listening to the wireless messages exchanged by the base stations. A further advantage is that the base stations need not be synchronized with each other.

Figure 7:
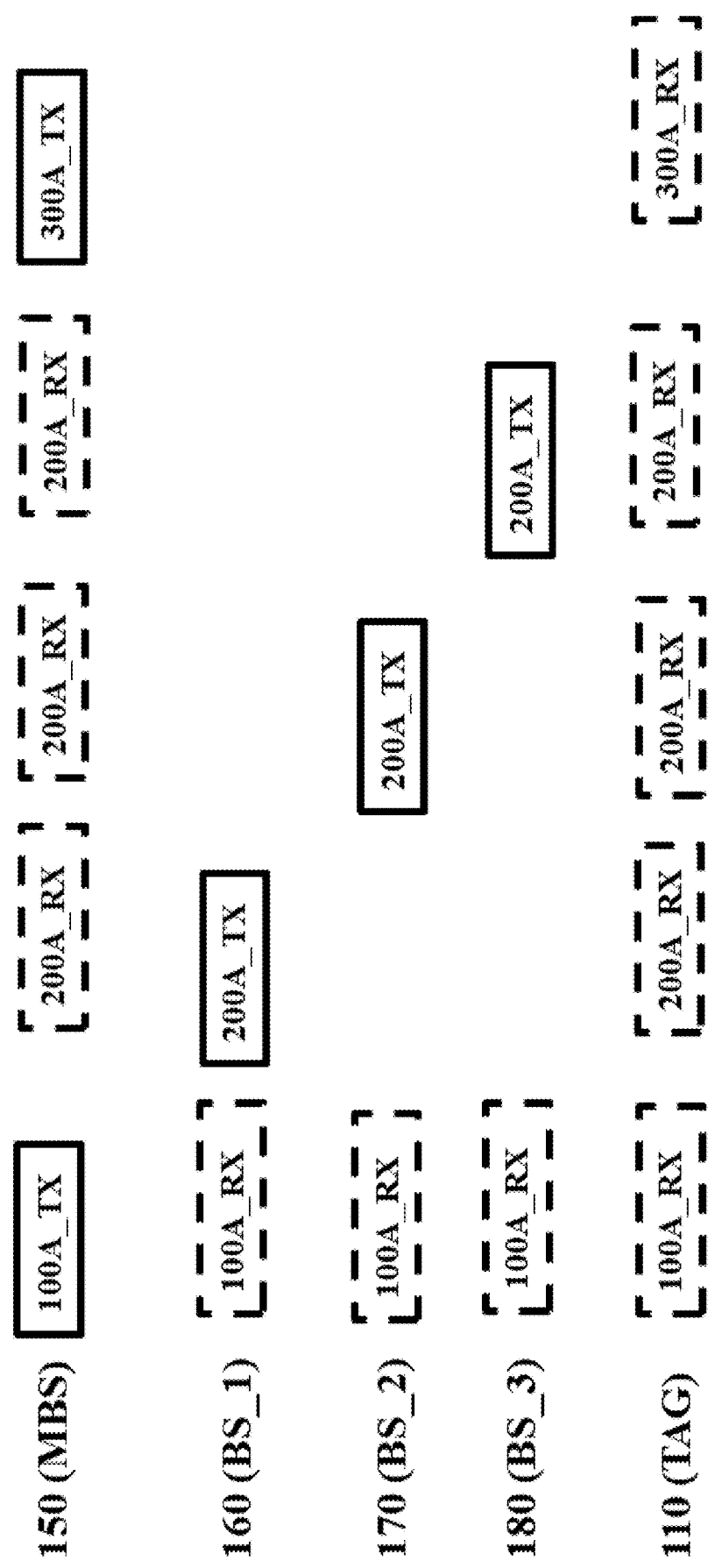
FIG. 7 illustrates timestamps in accordance with at least some embodiments of the present invention.

FIG. 7 illustrates timestamps in accordance with at least some embodiments of the present invention. In the illustrated example, a sole tag is positioned using a master base station and three non-master base stations BS_1, BS_2 and BS_3.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in positioning of electronic devices.

REFERENCE SIGNS LIST

| | |
|---|---|
| 110, 120, 130 | Tags |
| 150 | Master base station |
| 160, 170, 180 | Non-master base stations |
| 100A | Initial message |
| 200A | Response message |
| 300A | Data message |
| 400-470 | Structure of the device of FIG. 4 |
| 510-570 | Phases of the process of FIG. 5 |
| 610-620 | Phases of the process of FIG. 6 |

The invention claimed is:

1. An apparatus comprising:
a receiver configured to receive at least the following wireless messages: an initial message from a master base station, at least one response message from each of at least two non-master base stations and a data message from the master base station, the initial message comprising a timestamp indicating a time of transmission of the initial message and the data message comprising a timestamp indicating a time of transmission of the data message, and
at least one processing core configured to determine:
based on the received wireless messages, for the master base station and each non-master base station, a time difference of arrival from the apparatus, and
based at least partly on the determined time difference of arrival, a location of the apparatus,
wherein the apparatus is configured to determine the location further based on a ratio, determined for each specific non-master base station, between a first time delay and a second time delay, the first time delay elapsing between transmission of the initial message from the master base station and its receipt in the specific non-master base station and the second time delay elapsing between the transmission of the initial message from the master base station and transmission of the data message from the master base station.

2. The apparatus according to claim 1, wherein the data message comprises timestamps indicating for each response message a point in time, when the master base station received this response message.

3. The apparatus according to claim 1, wherein the apparatus is configured to record at least one of the following: for each response message a timestamp indicating when the apparatus received this response message, for the initial message a timestamp indicating when the apparatus received the initial message and for the data message a timestamp indicating when the apparatus received the data message.

4. The apparatus according to claim 1, wherein the apparatus is configured to receive the wireless messages using an ultra wide band, UWB, wireless interface.

5. The apparatus according to claim 1, wherein the apparatus is configured to determine the location of the apparatus without transmitting any wireless messages.

6. An apparatus comprising:
a wireless transceiver configured to transmit an initial message, to receive at least one response message from at least one non-master base station and to transmit a data message, the initial message comprising a timestamp indicating a time of transmission of the initial message and the data message comprising a timestamp indicating a time of transmission of the data message, and
at least one processing core configured to include in the initial message a timestamp indicating a point in time when the initial message is transmitted, and to include in the data message, for each received response message, a timestamp indicating a point in time when the respective response message was received in the apparatus
wherein the apparatus is configured to enable a tag receiving the initial message, the at least one response message and the data message to determine its location based at least in part on a ratio, determined for each specific non-master base station, between a first time delay and a second time delay, the first time delay elapsing between transmission of the initial message from the apparatus and its receipt in the specific non-master base station and the second time delay elapsing between the transmission of the initial message from the apparatus and the transmission of the data message from the apparatus.

7. The apparatus according to claim 6, wherein the apparatus is configured to include in the data message a timestamp indicating a point in time, when the data message is transmitted.

8. The apparatus according to claim 6, wherein the wireless transceiver is an ultra wide band wireless transceiver.

9. A method comprising:
receiving, in an apparatus, at least the following wireless messages: an initial message from a master base station, at least one response message from each of at least two non-master base stations and a data message from the master base station, the initial message comprising a timestamp indicating a time of transmission of the initial message and the data message comprising a timestamp indicating a time of transmission of the data message, and determining, based on the received wireless messages, for the master base station and each non-master base station, a time difference of arrival from the apparatus, and determining, based at least partly on the determined time difference of arrival, a location of the apparatus, further comprising determining the location further based on a ratio, determined for each specific non-master base station, between a first time delay and a second time delay, the first time delay elapsing between transmission of the initial message from the master base station and its receipt in the specific non-master base station and the second time delay elapsing between the transmission of the initial message from the master base station and transmission of the data message from the master base station.

10. The method according to claim 9, wherein the data message comprises timestamps indicating for each response message a point in time, when the master base station received this response message.

11. The method according to claim 9, further comprising recording at least one of the following: for each response message a timestamp indicating when the apparatus received this response message, for the initial message a timestamp indicating when the apparatus received the initial message and for the data message a timestamp indicating when the apparatus received the data message.

12. The method according to claim 9, further comprising receiving the wireless messages using an ultra wide band, UWB, wireless interface.

13. The method according to claim 9, further comprising determining the location of the apparatus without transmitting any wireless messages.

14. A method in an apparatus comprising:

transmitting an initial message, receiving at least one response message from at least one non-master base station and transmitting a data message, the initial message comprising a timestamp indicating a time of transmission of the initial message and the data message comprising a timestamp indicating a time of transmission of the data message, and including in the initial message a timestamp indicating a point in time when the initial message is transmitted, and including in the data message, for each received response message, a timestamp indicating a point in time when the respective response message was received in the apparatus, further comprising determining a ratio, determined for each specific non-master base station, between a first time delay and a second time delay, the first time delay elapsing between transmission of the initial message from a master base station and its receipt in the specific non-master base station and the second time delay elapsing between the transmission of the initial message from the master base station and transmission of the data message from the master base station.

15. The method according to claim 14, further comprising including in the data message a timestamp indicating a point in time, when the data message is transmitted.

16. The method according to claim 14, wherein the transmitting is performed using an ultra wide band wireless transceiver.

* * * * *